United States Patent
Wang (10) Patent No.: US 10,992,733 B1
(45) Date of Patent: Apr. 27, 2021

(54) WORKLOAD MANAGEMENT IN HYBRID CLOUDS

(71) Applicant: Cadence Designs Systems, Inc., San Jose, CA (US)

(72) Inventor: Albert Shuxin Wang, Saratoga, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 211 days.

(21) Appl. No.: 15/429,030

(22) Filed: Feb. 9, 2017

(51) Int. Cl.
  *H04L 29/08* (2006.01)
  *H04L 12/24* (2006.01)

(52) U.S. Cl.
  CPC .............. *H04L 67/10* (2013.01); *H04L 41/12* (2013.01); *H04L 41/22* (2013.01)

(58) Field of Classification Search
  CPC .......... H04L 67/10; H04L 41/12; H04L 41/22
  USPC ........................................................ 709/226
  See application file for complete search history.

(56) References Cited

U.S. PATENT DOCUMENTS

| | | | | |
|---|---|---|---|---|
| 2011/0016214 A1* | 1/2011 | Jackson | ................ | G06F 9/5044 709/226 |
| 2011/0251992 A1* | 10/2011 | Bethlehem | ............ | H04L 67/306 707/610 |
| 2012/0131591 A1* | 5/2012 | Moorthi | ................. | G06Q 10/06 718/104 |
| 2012/0204187 A1* | 8/2012 | Breiter | .................. | G06F 9/5072 718/105 |
| 2013/0238641 A1* | 9/2013 | Mandelstein | ......... | G06F 17/303 707/756 |
| 2014/0149494 A1* | 5/2014 | Markley | ................. | H04L 67/34 709/203 |
| 2016/0283331 A1* | 9/2016 | Barber | ..................... | G06F 9/466 |
| 2016/0342633 A1* | 11/2016 | Senthilnathan | ....... | G06F 16/134 |
| 2016/0342655 A1* | 11/2016 | Mishra | .................... | G06F 16/22 |
| 2016/0364265 A1* | 12/2016 | Cao | ........................ | G06F 9/5011 |

* cited by examiner

*Primary Examiner* — Umar Cheema
*Assistant Examiner* — Tony Williams
(74) *Attorney, Agent, or Firm* — Foley & Lardner LLP (57) ABSTRACT

The present embodiments relate generally to workload management and more particularly to a hybrid cloud workload management system and methodology which can effectively manage the execution of tasks of the same workload on both private and public clouds. In embodiments, user tasks are seamlessly and transparently executed on a public cloud if the private cloud does not have the necessary resources available. These and other embodiments automatically detect data dependencies of user tasks and build lists of data attributes of user tasks, which are used to populate and synchronize data needed for tasks before they are executed on the public cloud. Additional or alternative embodiments include the ability to intelligently scale the compute resources in the public cloud so that appropriate number of hosts with the resources needed by the user tasks are dynamically created and also properly purged upon user task completion.

13 Claims, 10 Drawing Sheets

New JS Portal

Job Summary

JobDir: /tr/sjisit04_scratch01/awang/expire_2017_02_30/tracedir/jsControl_19393+ICD:test:PV:test:10.202.122.21_19393
Project: ICD:test:PV:test:10.202.122.21_19393

| | |
|---|---|
| Project | ICD:test:PV:test:10.202.122.21_19393 |
| Submission | 2016-11-28@14:02:57 |
| Completion | 2016-11-28@16:29:33 |
| Elapsed_time | 02:26:36 |
| Total_tasks | 51 |
| Active_tasks | 0 |
| Pending_tasks | 0 |
| Pass_tasks | 51 |
| Error_tasks | 0 |
| Killed_tasks | 0 |
| Accumulated_runtime | 10:48:54 |
| Longest_task | /home/awang/icd-trace/runner.csh_1320309_ARM |
| Longest_task_runtime | 01:44:10 |
| Max_parallel_running_tasks | 10 |
| Max_parallel_running_agents | 10 |
| Logs | JobServer AgentCtrl |

502 —

Task Dashboard

JS Reports

- ● Job Summary
- ● Task List
- ● Task Timing
- ● RunTime Distribution
- ● Task Run History
- ● Task-Agent Assignment
- ● Agent History
- ● LSF CPU History
- ● Job Environment
- ● Rerun Failure
- ● Need help

[show]

FIG. 5

JS Reports

- ○ Job Summary
- ● Task List
- ○ Task Timing
- ○ Run Time Distribution
- ○ Task Run History
- ○ Task-Agent Assignment
- ○ Agent History
- ○ LSF CPU History
- ○ Job Environment
- ○ Rerun Failure
- ○ Need help

[Show]

JobDir/it/sjisi04_scratch01/awang/expire_20
Project:

| Task Name |
|---|
| /home/awang/icd-trace/runner.csh 601010_22 |
| /home/awang/icd-trace/runner.csh mf_894075_decrement |
| /home/awang/icd-trace/runner.csh declone_845174 |
| /home/awang/icd-trace/runner.csh lef_58new_layer_2 |
| /home/awang/icd-trace/runner.csh 1003479_editPin_spread1pin |
| /home/awang/icd-trace/runner.csh 1012701 |
| /home/awang/icd-trace/runner.csh1021245_WIDTHTABLE_assignPtnPin |
| /home/awang/icd-trace/runner.csh 1023557_20nm |
| /home/awang/icd-trace/runner.csh 1025571 |
| /home/awang/icd-trace/runner.csh 1033631 |
| /home/awang/icd-trace/runner.csh 1054384_ecoSwapSpareCell_noScanTrace_1 |
| /home/awang/icd-trace/runner.csh 1054384_ecoSwapSpareCell_noScanTrace_2 |
| /home/awang/icd-trace/runner.csh 1069494_AD_color |
| /home/awang/icd-trace/runner.csh 1069755_nomaskLayer |
| /home/awang/icd-trace/runner.csh 1069940_stack_via_EOL |
| /home/awang/icd-trace/runner.csh 1069940_stack_via_EOL_cui |
| /home/awang/icd-trace/runner.csh 1079857_deleteBNet |
| /home/awang/icd-trace/runner.csh 1079857_deleteBNet_moduleBased |
| /home/awang/icd-trace/runner.csh 1079857_getBusInfo |
| /home/awang/icd-trace/runner.csh 1079857_getBusInfor_1 |
| /home/awang/icd-trace/runner.csh 1080491_20nm |
| /home/awang/icd-trace/runner.csh 1082336_addModulePort_NR |
| /home/awang/icd-trace/runner.csh 1085006_planDesign |

New JS Portal

Task List

17_02_30/tracedir/jsControl_19393+ICD:test:PV:test:10.202.122.21_19393
ICD:test:PV:test:10.202.122.21_19393

| Start Time | Finish Time | Elapsed Time | Host | Logs | TraceLog |
|---|---|---|---|---|---|
| 2016-11-28@14:03:08 | 2016-11-28@14:09:45 | 397 | sjfn1512 | sjfn1512_5591388 | sjfn1512_5591388 |
| 2016-11-28@14:03:08 | 2016-11-28@14:06:51 | 223 | sjfqos831 | sjfqos831_5591391 | sjfqos831_5591391 |
| 2016-11-28@14:03:08 | 2016-11-28@14:07:40 | 272 | sjfqos823 | sjfqos823_5591387 | sjfqos823_5591387 |
| 2016-11-28@14:03:12 | 2016-11-28@14:14:07 | 655 | sjfsb046 | sjfsb046_5591396 | sjfsb046_5591396 |
| 2016-11-28@14:03:12 | 2016-11-28@14:39:40 | 2188 | sjfsb046 | sjfsb046_5591392 | sjfsb046_5591392 |
| 2016-11-28@14:03:12 | 2016-11-28@14:30:45 | 1653 | sjfsb046 | sjfsb046_5591397 | sjfsb046_5591397 |
| 2016-11-28@14:03:12 | 2016-11-28@14:09:02 | 350 | sjfsb046 | sjfsb046_5591394 | sjfsb046_5591394 |
| 2016-11-28@14:03:12 | 2016-11-28@14:35:26 | 1934 | sjfsb046 | sjfsb046_5591393 | sjfsb046_5591393 |
| 2016-11-28@14:03:12 | 2016-11-28@14:14:21 | 669 | sjfsb046 | sjfsb046_5591395 | sjfsb046_5591395 |
| 2016-11-28@14:03:12 | 2016-11-28@14:19:57 | 1005 | sjfsb046 | sjfsb046_5591398 | sjfsb046_5591398 |
| 2016-11-28@14:06:51 | 2016-11-28@14:09:06 | 135 | sjfsqos831 | sjfsqos831_5591391 | sjfsqos831_5591391 |
| 2016-11-28@14:07:42 | 2016-11-28@14:09:52 | 130 | sjfsqos823 | sjfsqos823_5591387 | sjfsqos823_5591387 |
| 2016-11-28@14:09:03 | 2016-11-28@14:12:10 | 187 | sjfsb046 | sjfsb046_5591394 | sjfsb046_5591394 |
| 2016-11-28@14:09:07 | 2016-11-28@14:23:04 | 837 | sjfsqos831 | sjfsqos831_5591391 | sjfsqos831_5591391 |
| 2016-11-28@14:09:46 | 2016-11-28@14:11:50 | 124 | sjfn1512 | sjfn1512_5591388 | sjfn1512_5591388 |
| 2016-11-28@14:09:52 | 2016-11-28@14:10:59 | 67 | sjfsqos823 | sjfsqos823_5591387 | sjfsqos823_5591387 |
| 2016-11-28@14:11:00 | 2016-11-28@14:33:56 | 1376 | sjfsqos823 | sjfsqos823_5591387 | sjfsqos823_5591387 |
| 2016-11-28@14:11:52 | 2016-11-28@14:32:31 | 1239 | sjfn1512 | sjfn1512_5591388 | sjfn1512_5591388 |
| 2016-11-28@14:12:11 | 2016-11-28@14:41:58 | 1787 | sjfsb046 | sjfsb046_5591394 | sjfsb046_5591394 |
| 2016-11-28@14:14:09 | 2016-11-28@14:41:51 | 1662 | sjfsb046 | sjfsb046_5591396 | sjfsb046_5591396 |
| 2016-11-28@14:14:23 | 2016-11-28@14:18:51 | 268 | sjfsb046 | sjfsb046_5591395 | sjfsb046_5591395 |
| 2016-11-28@14:18:51 | 2016-11-28@14:30:22 | 691 | sjfsb046 | sjfsb046_5591395 | sjfsb046_5591395 |
| 2016-11-28@14:19:58 | 2016-11-28@14:29:33 | 575 | sjfsb046 | sjfsb046_5591398 | sjfsb046_5591398 |

WORKLOAD MANAGEMENT IN HYBRID CLOUDS

TECHNICAL FIELD

The present embodiments relate generally to computer network management, and more particularly to managing workloads in a hybrid public/private cloud computer system.

BACKGROUND

Companies, such as those that develop computer software products for example, require substantial computer resources for developing and testing computer software products. Some companies have begun to rely on private compute clouds including a large number of virtual machines for allowing their employees to develop and test incremental "builds" or versions of software products or modules. However, private compute clouds suffer from compute resource shortages during peak workload periods, which can potentially delay product releases. A solution to this problem, among others, is needed.

SUMMARY

The present embodiments relate generally to computer workload management and more particularly to a hybrid cloud workload management system and methodology which can effectively manage the execution of tasks of the same workload on both private and public clouds. In embodiments, user tasks are seamlessly and transparently executed on a public cloud if the private cloud does not have the necessary resources available. These and other embodiments automatically detect data dependencies of user tasks and build lists of data attributes of user tasks, which are used to populate and synchronize data needed for tasks before they are executed on the public cloud. Additional or alternative embodiments include the ability to intelligently scale the compute resources in the public cloud so that appropriate number of hosts with the resources needed by the user tasks are dynamically created and also properly purged upon user task completion.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein.

DETAILED DESCRIPTION

The present embodiments will now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

According to certain aspects, the present embodiments relate to a hybrid cloud workload management system and methodology which can effectively manage the execution of tasks of the same workload on both private and public clouds. In embodiments, user tasks are seamlessly and transparently executed on a public cloud if the private cloud does not have the necessary resources available. These and other embodiments automatically detect data dependencies of user tasks and build lists of data attributes of user tasks, which are used to populate and synchronize data needed for tasks before they are executed on the public cloud. Additional or alternative embodiments include the ability to intelligently scale the compute resources in the public cloud so that appropriate number of hosts with the resources needed by the user tasks are dynamically created and also properly purged upon user task completion.

Figure 1:
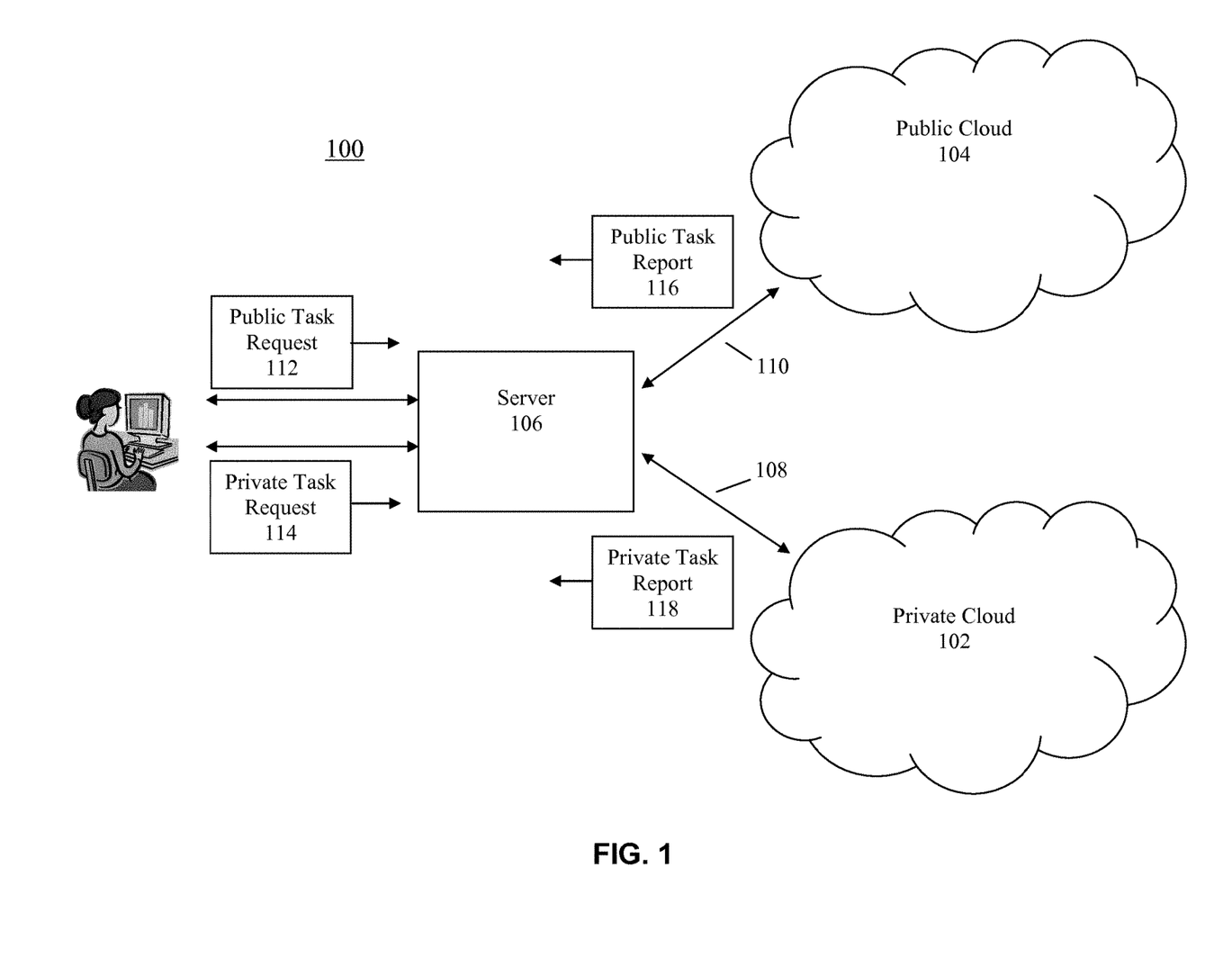
FIG. 1 is a block diagram illustrating a conventional hybrid compute cloud solution.

More particularly, as set forth above, companies with private compute clouds that suffer from compute resource shortages during peak workload periods. The present applicant recognizes that such companies can adopt a hybrid compute cloud solution. This solution includes using public compute clouds to help handle the peak workloads. FIG. 1 is a block diagram illustrating example aspects of a conventional hybrid compute cloud solution.

As shown, a conventional hybrid system 100 includes a private cloud 102 and a public cloud 104. A server 106 receives task requests from users and forwards them for handling by either or both of the private cloud 102 and public cloud 104. The communications between server 106 and private cloud 102 can be implemented using a private network 108. For example, the communications between server 106 and private cloud 102 can all occur behind a company firewall, as can communications between certain users (i.e. company employees) and server 106. Meanwhile communications between server 106 and public cloud 104 can be implemented using the public Internet 110.

In an example operation of conventional system 100, user requests for services (e.g. workload requests comprising a plurality of tasks) are by default forwarded by server 106 for handling by private cloud 102. For example, upon user submission for a workload on private cloud 102, private cloud workload schedulers in server 106 forward the separate task requests for a user's workload to private cloud 102 until all the tasks of the workload have been completed. During peak demand periods, when private cloud 102 resources are completely utilized, user tasks submitted to the private cloud will see long pending times until some tasks submitted earlier complete. To avoid such long pending times, users need to cut the total workload into smaller groups and submit some of them to the public cloud 104 instead through server 106. This normally requires manual distribution of tasks between private cloud 102 and public cloud 104 by users at submission time. Typically, there is no organic or automatic connection between the workload schedulers of the private cloud and the public cloud in server 106.

The present applicant further recognizes various problems with conventional hybrid compute cloud solutions such as that shown in FIG. 1. First, for example, user tasks cannot seamlessly flow from private cloud 102 to public cloud 104. Clouds 102 and 104 are two stand-alone clouds. Accordingly, users need to run separate commands 112, 114 in each cloud to execute tasks respectively. As a result, the real peak demands are not handled well and the private compute resources in private cloud 102 do not see near full utilization.

As another example, when user tasks run in both private and public clouds 102, 104, task results will exist in both places. As such, users need to develop separate reports 116, 118 to pull both results together.

As a further example, when certain tasks in a workload cannot run in the public cloud 104 due to security concerns, it is a manual process to separate those tasks and submit them separately to the private cloud 102 each time the workload is run. This is a tedious process.

As a still further example, user tasks can have complex data dependencies, especially tasks that were developed a long time ago that may need to read data from some directories that the current user is not aware of. Companies are moving entire data volumes into the public cloud 104 to avoid unexpected task failures as they do not know exactly which data will be needed by which tasks. This causes unnecessary data storage in the public cloud 104, and corresponding unnecessary expenses for the storage.

As yet another example, some compute workloads (especially those in EDA) have complex resource demands for the compute hosts. Some tasks need high memory, while some tasks of the same workload are more cpu intensive. In addition, different tasks in the same workload can have variable runtimes. This requires intelligent scaling of compute resources in the public cloud 104 to provide the needed resource promptly and also to avoid an unnecessary waste of resources.

Figure 2:
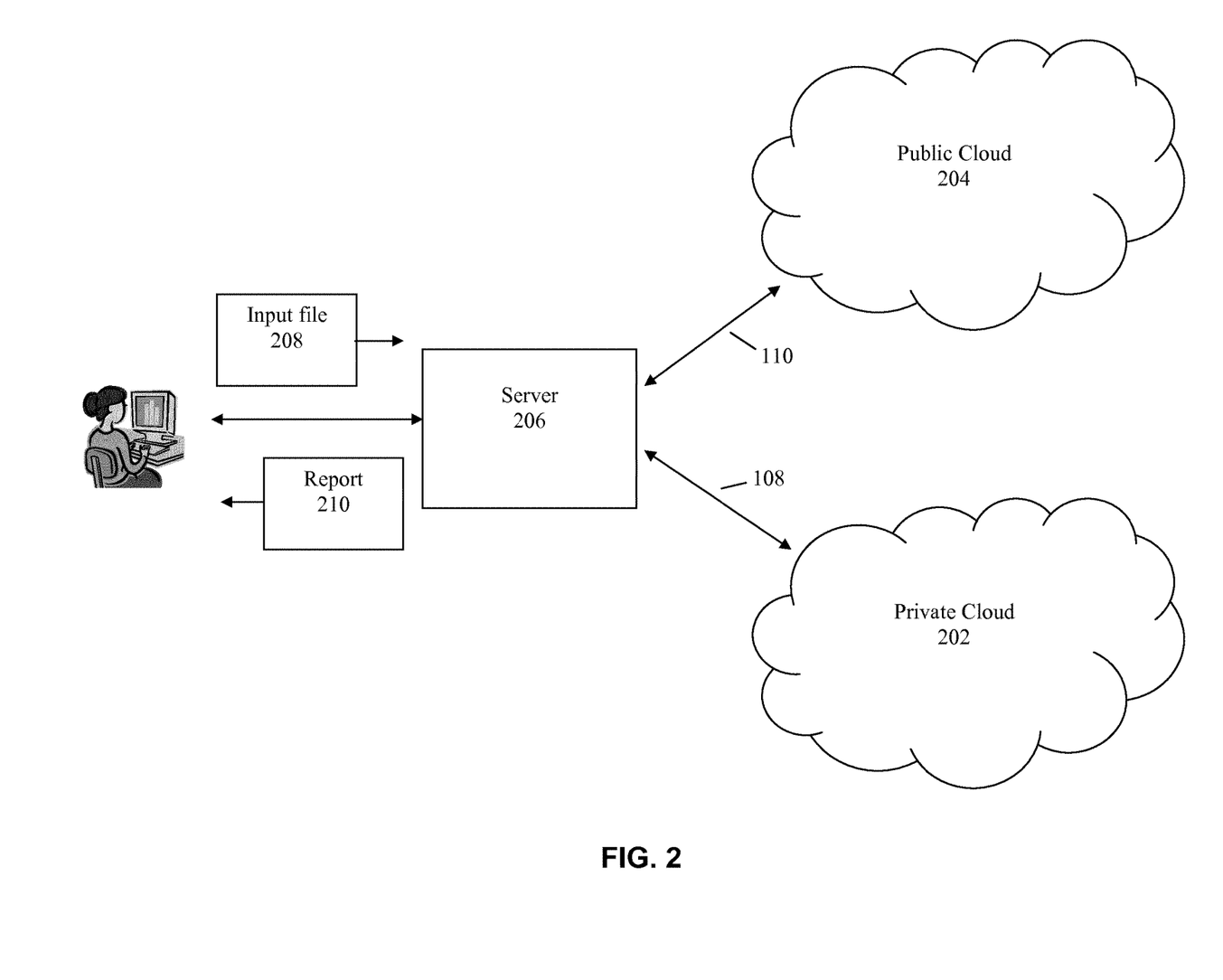
FIG. 2 is a block diagram illustrating a hybrid compute cloud solution according to the present embodiments.

FIG. 2 is a block diagram illustrating an example hybrid cloud compute system according to the present embodiments.

As in the above system 100, system 200 includes a private cloud 202 and public cloud 204. Notably, however, system 200 includes a workload management system 206 to handle requests for services from users. As described above, the communications between system 206 and private cloud 202 can be implemented using a private network 108. For example, the communications between system 206 and private cloud 202 can all occur behind a company firewall, as can communications between certain users (i.e. company employees) and system 206. Meanwhile communications between system 206 and public cloud 204 can be implemented using the public Internet 110.

Private cloud 202 can include physical resources and virtual resources implemented by, for example, an OpenStack platform, as adapted by the present embodiments as set forth in more detail below. Public cloud 204 is, for example, a cloud service such as that provided by Amazon Web Services, Google Cloud Platform and/or Microsoft Azure. System 206 can be implemented by one or more computing systems (e.g. server computers, etc.) comprising various components not shown such as processor(s), memory, disks, etc. The one or more computing systems may further write to and read from a local or remote volatile or non-volatile computer accessible storage that stores thereon data or information such as, but not limited to, data that may be required to support the hybrid cloud compute management methodology of the present embodiments. The one or more computing systems may further be loaded with software that may be required to support the hybrid cloud compute management methodology of the present embodiments. Those skilled in the art will understand how to implement such software after being taught by the present examples.

In the example shown in FIG. 2, users define the workload in an input file 208 containing, for example, the list of tasks with or without dependency to run, resource and data requirements of tasks, clouds to be used, and maximum number of parallel cpus to be used, etc. Users can further define the pattern of the mixed use of private and public clouds, such as using private cloud 202 first and overflow to public cloud 204 if the private cloud does not provide certain number of cpus, or running 70% of the workload in private cloud 202 and 30% in the public cloud 204. Other use cases of input file 202 include 1) user defines the desired turnaround time for the workload, and system 206 automatically dispatches the proper amount of load to private cloud 202 and public cloud 204, 2) user defines the maximum budget allocated for the workload with flexible execution time and system 206 determines the best time to start the workload in public cloud 204, 3) users can also flag those tasks in the input file 208 that cannot run in public cloud 204 due to security concerns and system 206 will only dispatch those into the private cloud 202.

Tasks in workloads managed by system 206 and defined in input file 208 can seamlessly overflow from private cloud 202 to public cloud 204 based on resource availability or following user defined patterns of using private cloud 202 and public cloud 204. This is performed by system 206 transparently to the users. As set forth in more detail below, system 206 includes built-in functions to automatically detect data dependencies of the user's tasks and to build data attributes required by user tasks, which can be used to synchronize data ahead of task execution in the public cloud 204. The data attributes of user tasks can also include security information which can be used to determine if the task can be shipped to the public cloud. Another feature of the embodiments and described in more detail below is to intelligently scale the compute resources in the public cloud 204 so that an appropriate number of hosts with the resources needed by the user tasks are dynamically created and also properly purged upon user task completion.

Figure 3:
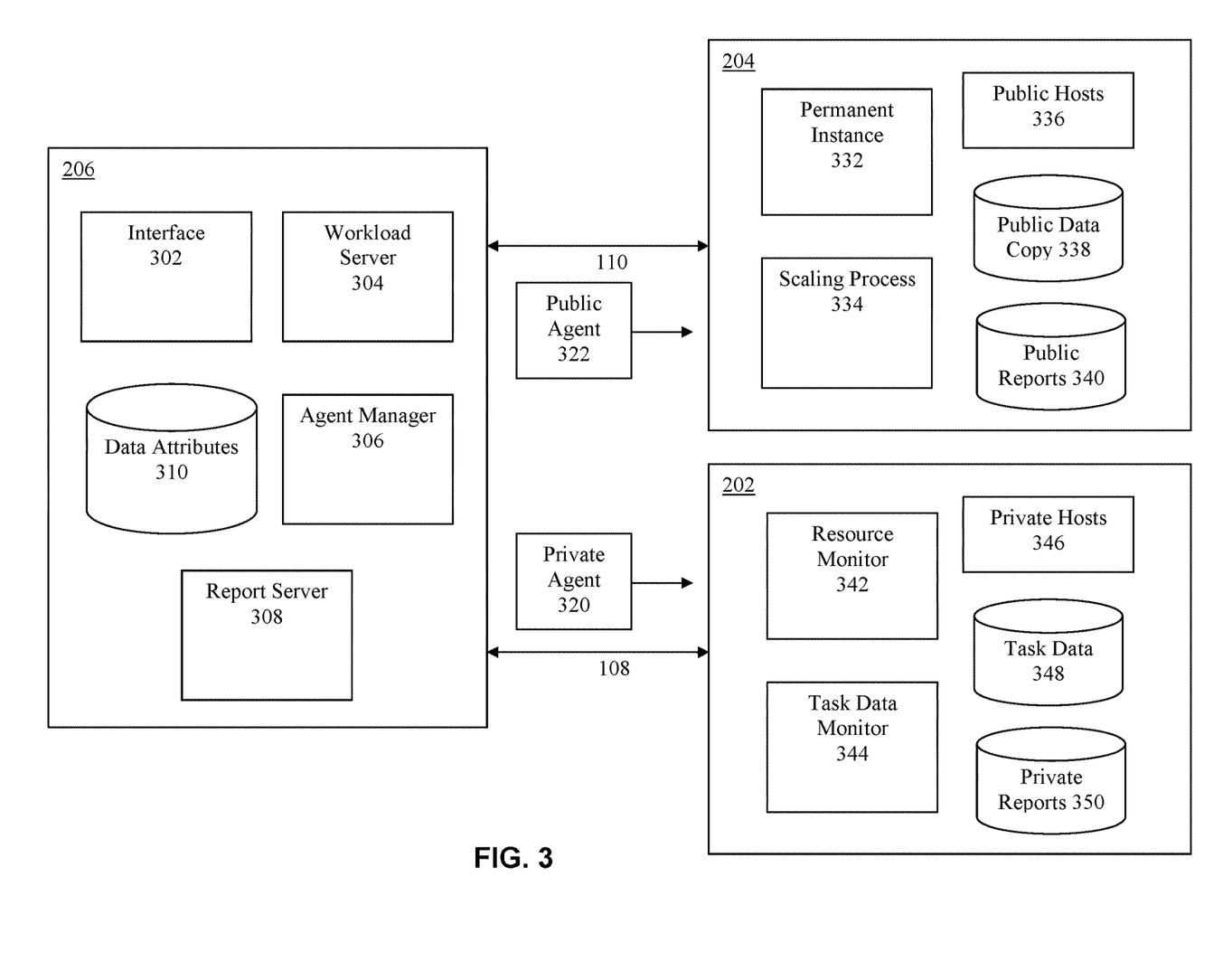
FIG. 3 is a block diagram illustrating an example workload management system for managing user workloads in a hybrid compute cloud solution according to the present embodiments.

FIG. 3 is a block diagram illustrating an example implementation of system 206 according to embodiments. As shown, the example system 206 includes a user interface 302, instances of workload management server 304, agent manager 306, and a report server 308.

User interface 302 provides the uniform user task submission mechanism for using the private cloud 202, public cloud 204, or both. The workload input file 208 is submitted to user interface 302. A workload server 304 instance is created for the workload after the submission is received.

Figure 4:
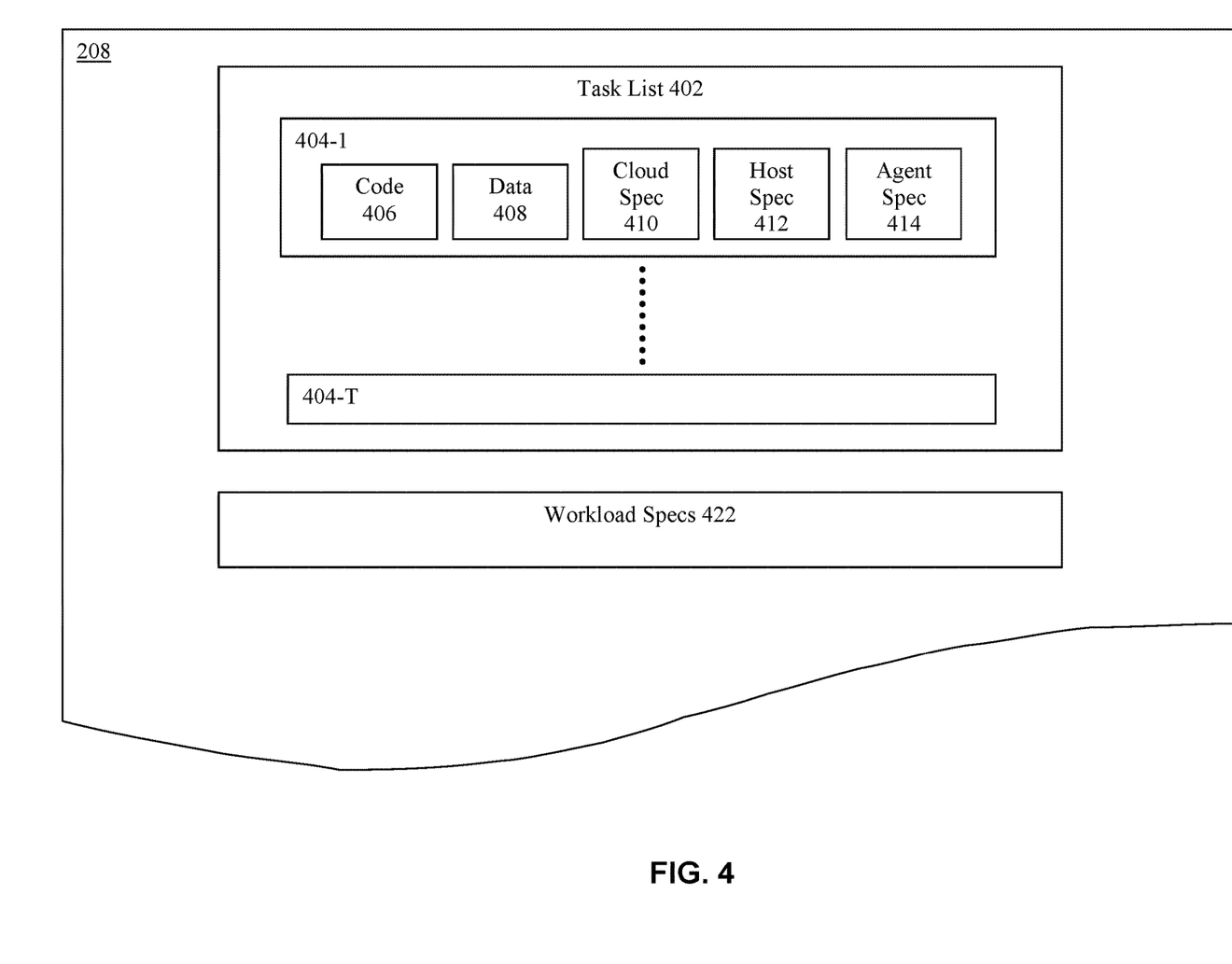
FIG. 4 is a diagram illustrating an example input file for describing a workload for execution by a hybrid compute cloud solution according to the present embodiments.

A block diagram of an example user input file 208 for use in embodiments such as that illustrated in FIG. 3 is shown in FIG. 4. As shown in this example, file 208 includes a task list 402 for the workload. Each task 404 listed in list 402 includes several definitions or descriptions. Code 406 refers to the executable code associated with the task 404, which can be a recent build or version of a software module for which the user wants to run test cases, for example. In this example, data 408 is a set of data for a test case for testing the software module. It should be noted that both code 406 and data 408 can be specified using file names or other pointers. It should be further noted that these examples of code 406 and data 408 are non-limiting. Cloud specification 410 specifies whether the task 404 must be executed on private cloud 202 or if it can be executed on either cloud 202 or public cloud 204.

Host specification 412 specifies the requirements of hosts 336 or 346 for executing the task. For example, this can specify one or more of an operating system (e.g. Linux), a minimum amount of memory the host should have, a minimum number of CPUs the host should have, etc. Agent specification 414 can include requirements for the agent associated with the task, such as a command that the agent must execute to validate the host before receiving the task, a directory that the host must check before starting the agent, flags that determine whether to abort completely when a task fails, or whether to just rerun the task, the number of tasks that can be run in parallel by a single agent, etc.

As shown, in this example file 208 further includes specifications 422 for the workload as a whole. For example, this can include a project name for all tasks 404, a runtime limit for all tasks in the workload, a runtime limit for the whole workload as a whole, the maximum number of agents running in parallel, etc.

In one example implementation of input file 208 and interface 302, the file 208 is a text file (e.g. having a filename such as /tmp/task.list), and users run a command via interface 302 to submit the workload (e.g. /grid/sfi/farm/bin/newsub-i/tmp/task.list). Upon submission, the interface 302 can return a job report URL, for example, that the user can use to access reports from server 308 as will be described in more detail below. It should be noted that the embodiments are not limited to a file 208 such as that described above. For example, interface 302 can include various user interface elements such as drop down lists, screens with fields to fill in details, etc., possibly in addition to a file 208, for allowing a user to define and submit a workload.

Returning to FIG. 3, whenever a file 208 is submitted to interface 302, a workload server 304 instance is created and the workload server 304 creates the agent manager 306 process. Agent manager 306 dispatches agents 320, 322 to the proper cloud, based on the overflow pattern defined by the user in input file 208 for example. After the agents start on a host (one of private hosts 346 or public hosts 336), agent manager 306 streams the user tasks following the dependency defined in user input file 208 to those running agents 320, 322 for execution.

As shown in this example, embodiments of private cloud 202 include a resource monitor process 342 and a task data monitor process 344. Resource monitor process 342 determines the amount of resources that are being used in private cloud 202 and reports this to system 206. This determination and reporting is done periodically based on user specific settings or a global setting, for example. With this information, workload server 304 can cause user tasks that are not required to be executed in private cloud 202 to be sent to public cloud 204 for execution instead, for example when resources in private cloud 202 are being fully utilized.

Task data monitor process 344 enables automatic tracing of data needed by user tasks. For example, whenever a task is executed using private hosts 346, process 344 monitors the data that is read/written by the tasks (e.g. by determining what data files stored in task data 348 that are accessed during execution of the tasks by hosts 346). Process 344 then produces a directory/file list of task data 348 that was used by the task and forwards it to system 206. The directory list is used by system 206 to build the data attributes 310 of all user tasks. Whenever that task is executed in the future by hosts 346, process 344 can monitor whether the directory/file list has changed, and if so, process 344 can notify system 206, which can then update data attributes 310.

The information in data attributes 310 is used for seeding a public data copy 338 of user data 348 in the public cloud 204 when it is first deployed. It is also used by system 206 to automatically synchronize data stored in public data copy 338 with data stored in task data 348 before user tasks start in the public cloud 204 to avoid unexpected failures. For example, when workload server 304 causes agent manager 306 to dispatch an agent 322 to public cloud 204 for a particular task, it can read the data attributes for that task in store 310 and determine whether the data in public data copy 338 needs to be updated. If so, it causes the associated data in task data 348 to be copied to public data copy 338 before the task is streamed to the associated agent 322.

As shown in the example of FIG. 3, public cloud 204 includes a permanent instance 332 and a scaling process 334. Permanent instance 332 is created by system 206 whenever the public cloud 204 is first deployed. In one example of public cloud 204, instance 332 receives the public agents 322 dispatched to the public cloud 204. Scaling process 334 will create on-demand instances based on the number of agents received and the resource requirements of the agents.

More particularly, agents 322 submitted to the public cloud 204 carry the compute resource requirements for the associated tasks, such as those defined by specifications 412 and 414, for example. Scaling process 334 in public cloud 204 promptly creates appropriate compute hosts 336 with the desired resources immediately after agents show up in the public cloud 204. It also monitors the compute hosts 336 so that idle hosts are terminated properly to minimize potential charges by the public cloud 204.

Agents 322 associated with tasks executed inside public cloud 204 cause task results 340 to be stored inside the public cloud 204 (e.g. a file having an associated URL). The same workload in a hybrid cloud environment can have results partially in private cloud 202 and partially in public cloud 204. In embodiments, agents 320 and 322 are configured to forward information about the results 340 to report server 308. Agents 320 and 322 can be further configured to forward other information about tasks to server 308, such as start and end time, etc. In response to user requests, for example, server 308 can pull data from both private and public clouds for one or more consolidated reports 210 (e.g.

having a URL specified when a user file 208 is submitted to interface 302 as described above).

FIGS. 5 to 8 are screen shots of example reports 210 provided by server 308 by which users can monitor the progress of a workload in real time and also get job statistics and results. Those skilled in the art will understand how reports 210 according to these examples can be constructed, for example by generating web (e.g., HTML) pages that are accessed by a browser or similar mechanism.

Figure 5:
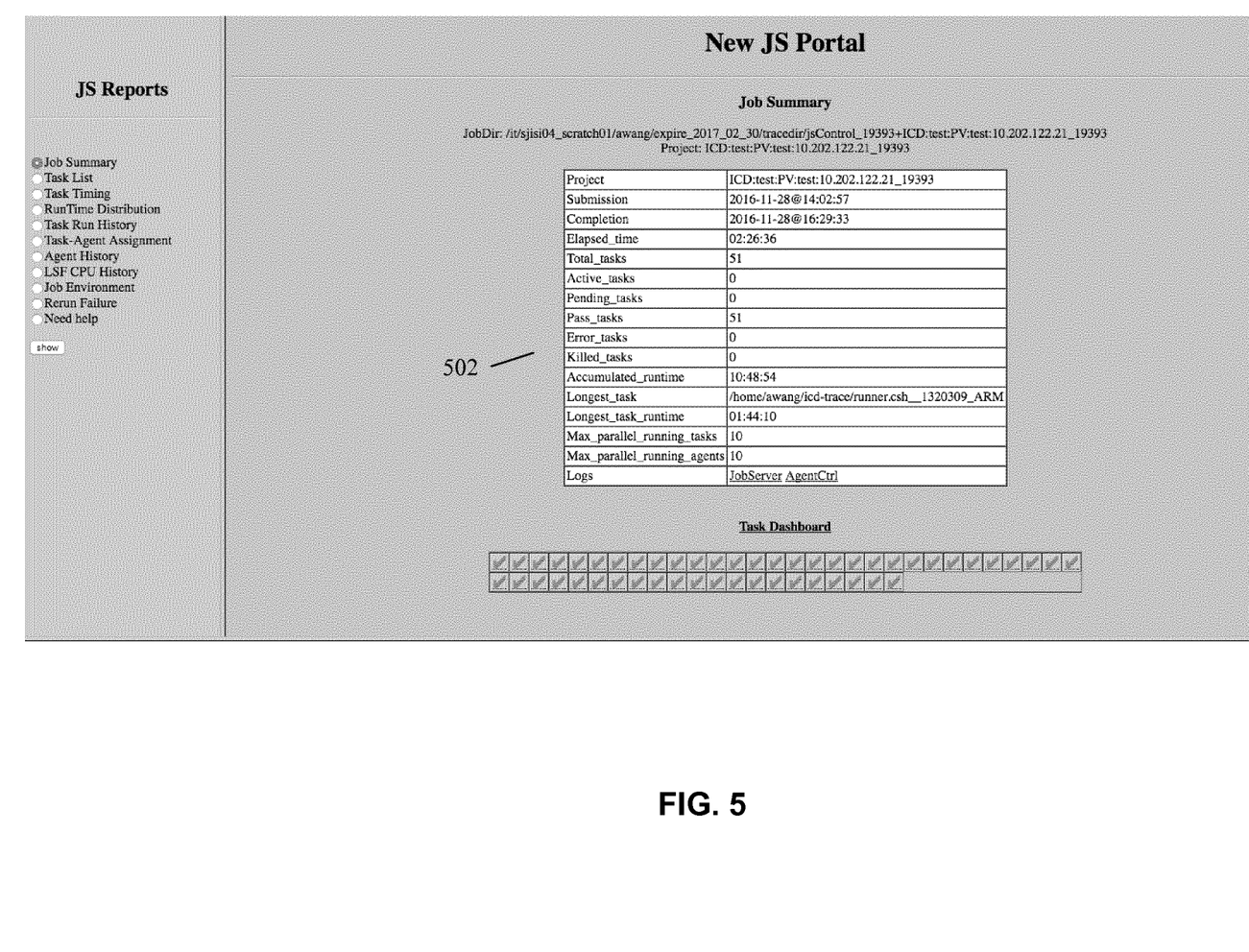
FIGS. 5 to 8 are screenshots illustrating example reports that can be provided in connection with workloads managed by the present embodiments.

The example screen shot (e.g. web page) of FIG. 5 includes a job summary report with summary information 502 about a workload that has been submitted and completed. In this example, the summary includes information such as the total elapsed time for completing the workload, the total number of tasks in the workload, the number of tasks in the workload that were killed or had errors, the longest running task in the workload, and the maximum number of tasks/agents being executed in parallel. For workloads that have not already completed, a similar summary report such as that shown in FIG. 5 would include real-time status information such as the number of tasks that are currently being actively executed and the number of pending tasks.

Figure 6:
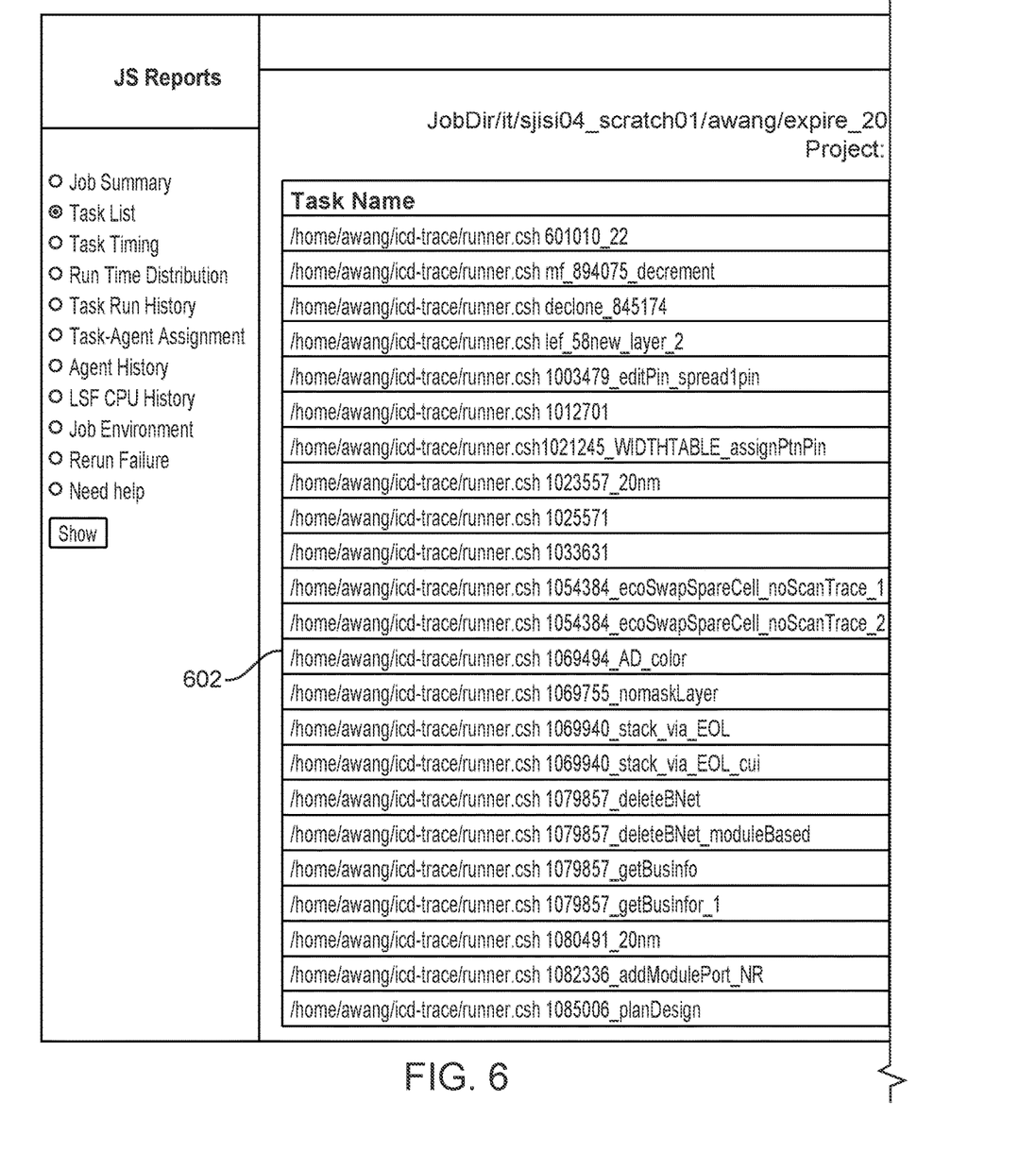

The example screen shot (e.g. web page) of FIG. 6 includes a list 602 of tasks in a workload, along with links 604 to individual reports regarding their execution. The links point to reports 340, 350 in the public cloud 204 and private cloud 202, respectively, as described above. The information for the tasks in list 602 also includes the execution time and the host on which the task was executed.

Figure 7:
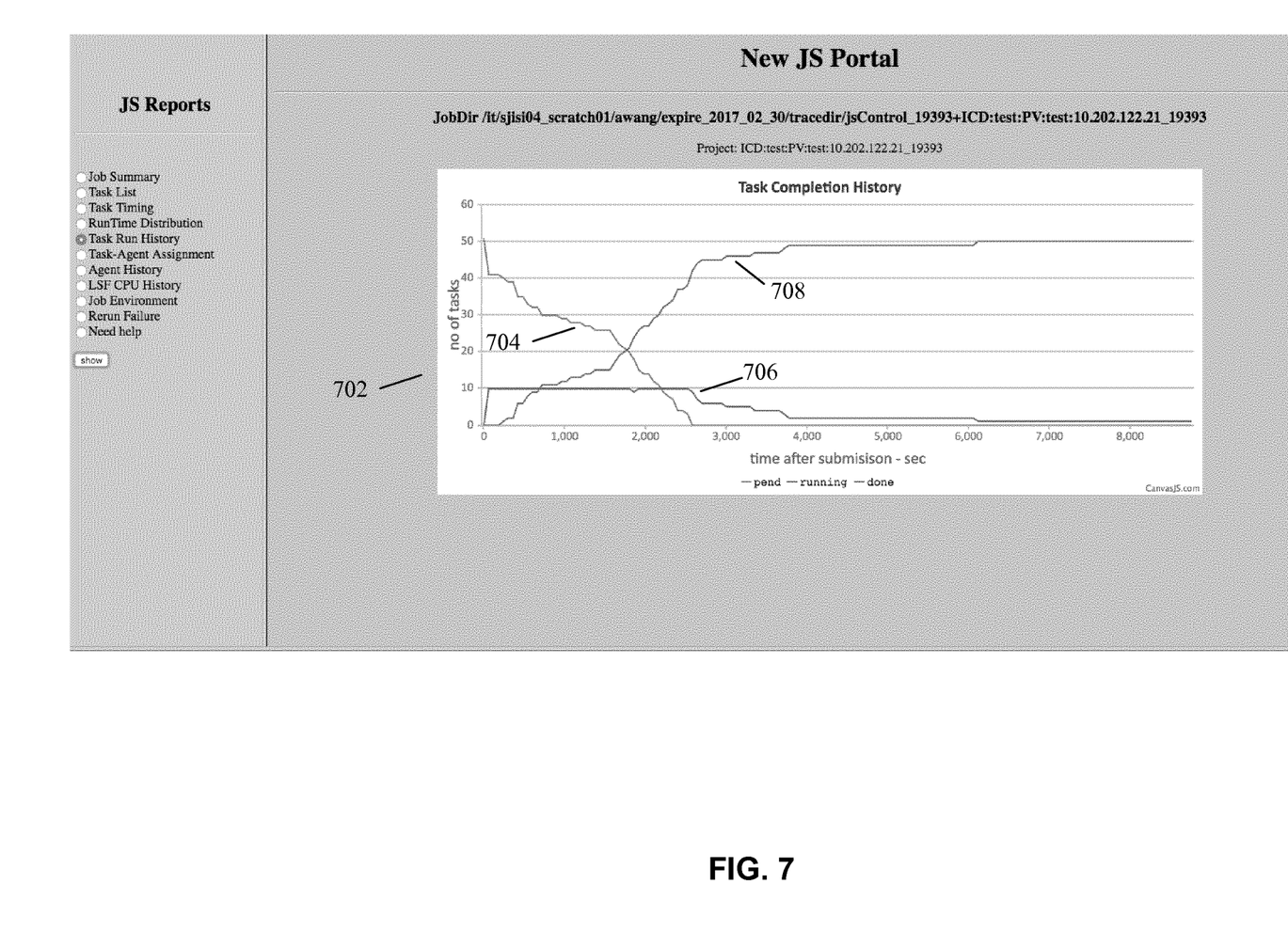
Figure 8:
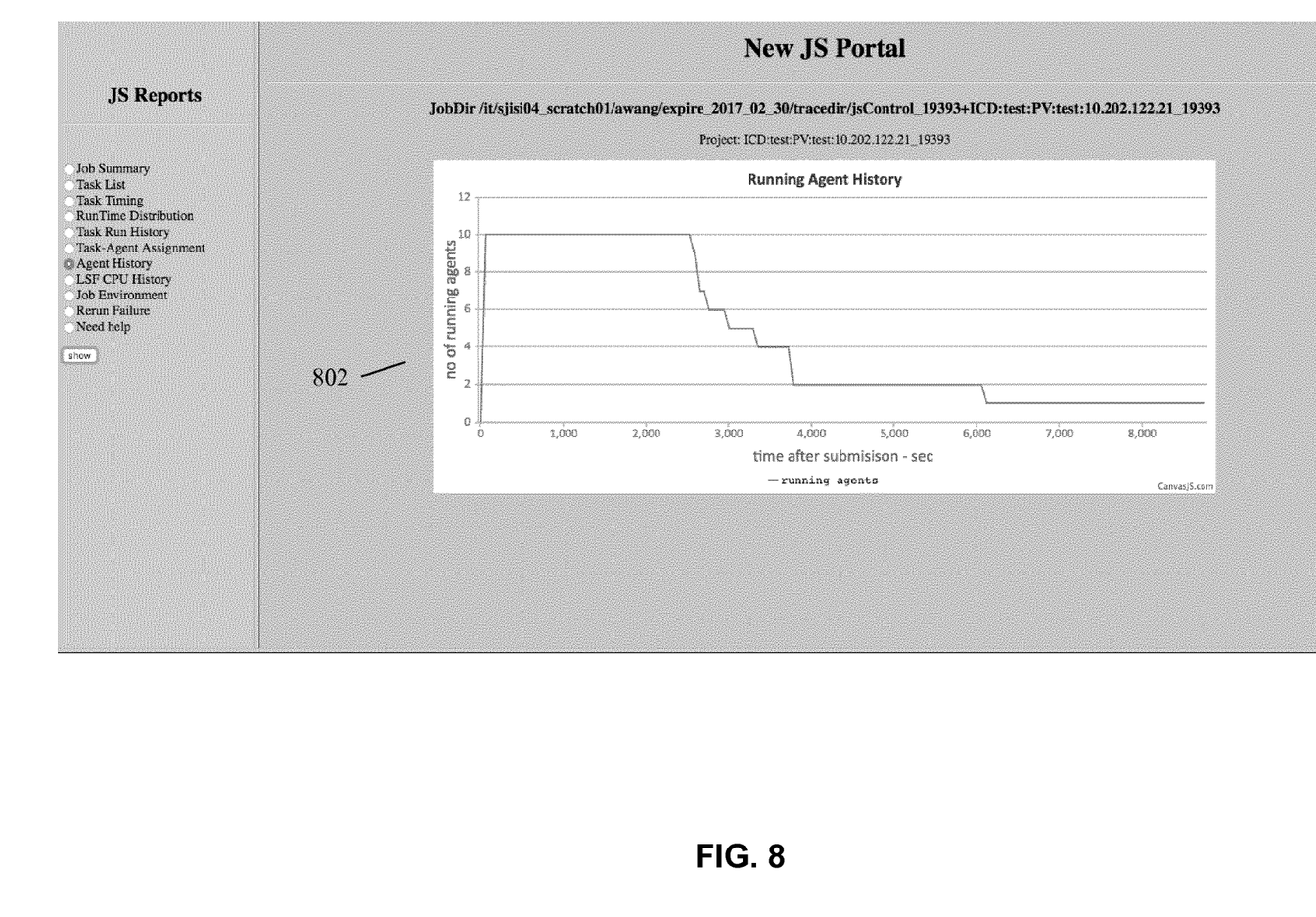

The example screen shots (e.g. web pages) of FIG. 7 and FIG. 8 illustrate how server 308 can generate graphical displays based on the execution information provided by agents. The example of FIG. 7 includes a graph 702 that illustrates that number of tasks pending 704, running 706 and completed 708 as a function of time after workload submission. The example of FIG. 8 includes a graph 802 that illustrates the number of running agents as a function of time after workload submission.

Figure 9:
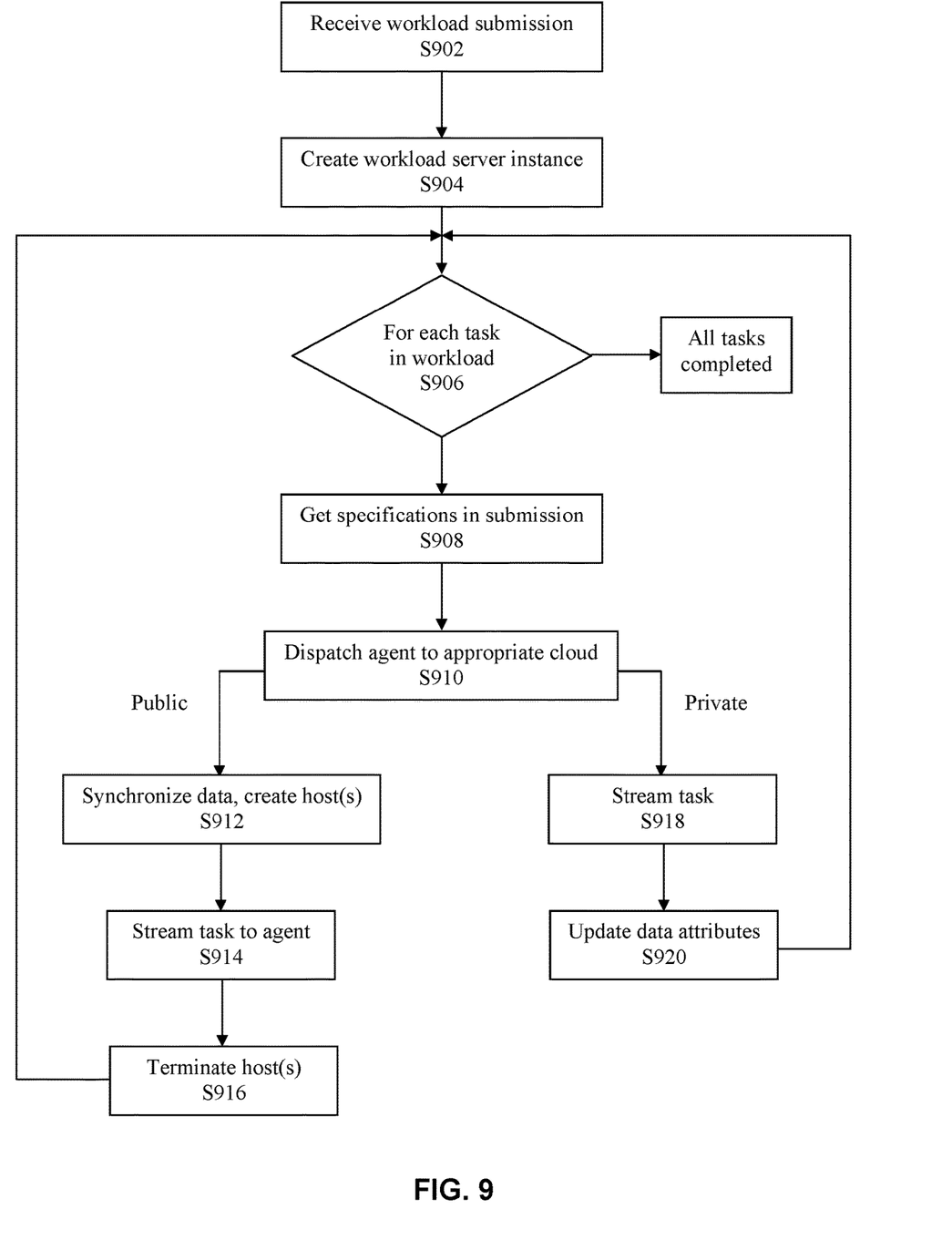
FIG. 9 is a flowchart illustrating an example methodology for managing workloads in a hybrid compute cloud solution according to the present embodiments.

FIG. 9 is a flowchart illustrating an example hybrid cloud workload management methodology according to embodiments.

As shown in step S902 a workload submission is received by system 206, for example via an input file 208 and interface 302. In step S904 a workload server instance 304 is created for the workload in response to the submission. In step S906, the following processing for each task in the workload is commenced until all tasks in the workload have completed. The specifications for the task are determined, for example from input file 208. These specifications can include the specifications described in connection with FIG. 4, for example.

Among the specifications for the task can be whether or not the task can be executed on the public cloud. Moreover, the current status of private server 202 may indicate that all resources are being fully utilized. Depending on this information, for example, in step S910 the agent manager 306 dispatches an agent for the task to the appropriate cloud. If the agent is dispatched to public cloud 204, in step S912 the public data copy 338 for the task is synchronized, if necessary (as determined by data attributes 310), and scaling process 334 creates the host(s) 336 having the appropriate compute requirements as specified for the task. Next in step S914, the task is streamed to the agent for execution on the host(s) 336. After the task is complete, the report is stored in reports 340 and the appropriate execution information for the task is returned to agent manager 306, which information can be used by report server 308. Then in step S916, the scaling process 334 terminates any idle hosts. If the agent is dispatched to private cloud 202, the task is streamed to the agent for execution by host(s) 346 in step S918. The data used by the task during its execution is monitored by task data monitor 344 and this information is used to update data attributes 310. After the task is complete, the report is stored in reports 350 and the appropriate execution information for the task is returned to agent manager 306, which information can be used by report server 308.

Although the present embodiments have been particularly described with reference to preferred ones thereof, it should be readily apparent to those of ordinary skill in the art that changes and modifications in the form and details may be made without departing from the spirit and scope of the present disclosure. It is intended that the appended claims encompass such changes and modifications.

What is claimed is:

1. A method comprising:
    receiving a submission for a workload comprising a plurality of tasks;
    receiving a specification associated with one of the tasks;
    monitoring resources available in a private cloud for executing the one task;
    if there are insufficient resources available in the private cloud, automatically determining whether to send the task to a public cloud based on the specification;
    if the task is sent to the public cloud:
        determining data dependencies associated with data needed by the task and automatically updating a copy of the data in the public cloud in accordance with the determined data dependencies, wherein the data dependencies include one or more identifiers of data files that are accessed by the task, and wherein automatically updating includes synchronizing the data in the public cloud from data stored in the private cloud responsive to the task being sent to the public cloud and before execution of the task by the public cloud;
        computing how many hosts to create in the public cloud based on the specification;
        creating one or more hosts in the public cloud for executing the task;
        causing the task to be executed by the one more hosts in the public cloud after synchronizing the data in the data files accessed by the task from the private cloud; and
        automatically terminating the one or more hosts after the task has been executed;
    sending a first one of the tasks to the public cloud;
    sending a second one of the tasks to the private cloud; and
    allowing first and second reports associated with the first and second tasks, respectively, to be accessed from both the public and private clouds via a common interface.

2. The method of claim 1, further comprising determining compute resources associated with the created one or more hosts based on the specification.

3. The method of claim 2, wherein the determined compute resources comprise one or more of a number of CPUs, an amount of memory and an operating system.

4. The method of claim 1, wherein sending the task to the public cloud includes:
    dispatching, by an agent manager configured to manage the execution of tasks by the public cloud in accordance with parameters in the workload, an agent to a permanent instance in the public cloud;

creating one or more hosts in the public cloud for the dispatched agent; and streaming the task to the dispatched agent.

5. The method of claim 1, further comprising, if the task is sent to the private cloud:

causing the task to be executed by one or more hosts in the private cloud;

automatically determining data accessed by the task during execution; and updating the identifiers of data files that are accessed by the task based on the automatic determination.

6. The method of claim 5, further comprising using the list for synchronizing the data from the private cloud in the public cloud.

7. The method of claim 1, wherein the common interface comprises a web pages with links to the first and second reports.

8. A system including a non-transitory computer readable medium configured to store and execute instructions, comprising:

a private network connection with a private cloud;

a public network connection with a public cloud;

an interface for receiving a submission for a workload comprising a plurality of tasks, the submission including receiving a specification associated with one of the tasks;

an agent manager operable to dispatch agents to the private cloud and the public cloud based on parameters in the workload; and a workload server operable to automatically cause the agent manager to dispatch an agent for the task to an appropriate one of the public and private clouds based on a determination associated with the task;

a list of data associated with the tasks, the workload server being operative to determine data dependencies of the list of data and to update data in the public cloud based on execution of the tasks by the private cloud and the determined data dependencies, wherein the data dependencies include one or more identifiers of data files that are accessed by the task, and wherein the workload server is operative to update the data by synchronizing the data in the public cloud from data stored in the private cloud responsive to the task being sent to the public cloud and before execution of the task by the public cloud, and wherein if the task is dispatched to the public cloud, the workload server is further operable to:

compute how many hosts to create in the public cloud based on the specification;

create one or more hosts in the public cloud for executing the task;

cause the task to be executed by the one more hosts in the public cloud after synchronizing the data in the data files accessed by the task from the private cloud; and automatically terminate the one or more hosts after the task has been executed; and a report server, wherein when a first one of the tasks is sent to the public cloud and a second one of the tasks is sent to the private cloud, the report server is operable to cause first and second reports associated with the first and second tasks, respectively, to be accessed from both the public and private clouds via a common interface.

9. The system of claim 8, wherein the determination comprises a monitored amount of resources available in the private cloud.

10. The system of claim 8, wherein the determination comprises a determined level of security associated with the task.

11. The system of claim 8, wherein the determination comprises a cloud requirement associated with the task in the specification.

12. The system of claim 8, wherein copies of data from the private cloud in the public cloud are made based on the list.

13. The system of claim 8, wherein the common interface comprises a web pages with links to the first and second reports.

* * * * *